United States Patent
Jain et al.

(10) Patent No.: US 11,475,458 B2
(45) Date of Patent: Oct. 18, 2022

(54) IN-APP LEAD NURTURING WITHIN AN ELECTRONIC DOCUMENT

(71) Applicant: ADOBE INC., San Jose, CA (US)

(72) Inventors: Ajay Jain, Up (IN); Eric Kienle, Portland, OR (US); Sachin Soni, New Delhi (IN); Sanjeev Tagra, Haryana (IN)

(73) Assignee: ADOBE INC., San Jose, CA (US)

( * ) Notice: Subject to any disclaimer, the term of this patent is extended or adjusted under 35 U.S.C. 154(b) by 411 days.

(21) Appl. No.: 16/527,443

(22) Filed: Jul. 31, 2019

(65) Prior Publication Data

US 2021/0035111 A1 Feb. 4, 2021

(51) Int. Cl.
| | |
|---|---|
| G06F 17/00 | (2019.01) |
| G06Q 30/00 | (2012.01) |
| H04L 67/06 | (2022.01) |
| H04L 67/10 | (2022.01) |
| G06F 40/169 | (2020.01) |
| H04L 67/01 | (2022.01) |

(52) U.S. Cl.
CPC .......... *G06Q 30/01* (2013.01); *G06F 40/169* (2020.01); *H04L 67/06* (2013.01); *H04L 67/10* (2013.01); *H04L 67/01* (2022.05)

(58) Field of Classification Search
CPC ....... G06F 40/169; G06Q 30/01; H04L 67/06; H04L 67/10
USPC .......................... 715/230, 255; 705/342, 333
See application file for complete search history.

(56) References Cited

U.S. PATENT DOCUMENTS

| | | | | |
|---|---|---|---|---|
| 6,826,594 B1* | 11/2004 | Pettersen | ................ | H04L 29/06 |
| | | | | 709/203 |
| 8,660,872 B1* | 2/2014 | Sedota, Jr. | ............. | G06Q 50/16 |
| | | | | 705/7.11 |
| 11,030,644 B1* | 6/2021 | Kakani | ............. | G06Q 30/0269 |
| 11,263,646 B1* | 3/2022 | Johnston | .......... | G06F 16/24578 |
| 11,334,476 B2* | 5/2022 | Sachdev | ........... | G06Q 30/0203 |

(Continued)

OTHER PUBLICATIONS

Albert, A Model for design and Management of Content and Interactivity of Customer-Centric Web Sites', Management Information Systems Research Center (Year: 2004).*

*Primary Examiner* — Stephen S Hong
*Assistant Examiner* — Matthew J Ludwig
(74) *Attorney, Agent, or Firm* — F. Chau & Associates, LLC

(57) ABSTRACT

The present disclosure relates to a cloud-based system including a server for generating and nurturing leads using within-a document lead nurturing. The server enables a marketer to generate initial content and contextual content, specify a consumption condition with respect to the initial content, and generate an electronic file including the initial content and executable code configured to monitor consumption of the initial content. A user (e.g., possible lead) uses a reader program of their device to open the electronic file, which presents the initial content and triggers execution of an instruction of the executable code to monitor interactions of the user with the initial content to determine whether the consumption condition has been satisfied. The reader program executes another instruction of the executable code to present the contextual content and notify the server that the user is a possible lead, when the consumption condition is satisfied.

20 Claims, 9 Drawing Sheets

(56) References Cited

U.S. PATENT DOCUMENTS

| | | | |
|---|---|---|---|
| 2013/0326375 A1* | 12/2013 | Barak | G06Q 30/0201 715/758 |
| 2014/0025509 A1* | 1/2014 | Reisz | G06Q 30/0244 705/14.71 |
| 2014/0074550 A1* | 3/2014 | Chourey | G06Q 30/02 705/7.29 |
| 2014/0108494 A1* | 4/2014 | Kahlert | G06Q 30/02 709/203 |
| 2014/0201613 A1* | 7/2014 | Della Corte | G06F 3/04817 715/233 |
| 2016/0217476 A1 | 7/2016 | Duggal et al. | |
| 2016/0335600 A1* | 11/2016 | Jain | G06Q 10/1053 |
| 2017/0236133 A1* | 8/2017 | Viner | G06F 3/0487 705/7.29 |
| 2017/0293940 A1* | 10/2017 | Aggarwal | G06Q 30/0269 |
| 2018/0234367 A1* | 8/2018 | Lange | H04L 51/08 |
| 2018/0286401 A1* | 10/2018 | Oh | G10L 15/22 |
| 2019/0057393 A1* | 2/2019 | Gorny | G06Q 30/01 |
| 2019/0155870 A1* | 5/2019 | Prakash | G06F 40/143 |
| 2019/0244131 A1* | 8/2019 | Levi | G06N 5/04 |
| 2021/0224858 A1* | 7/2021 | Khoury | G06N 20/00 |

\* cited by examiner

IN-APP LEAD NURTURING WITHIN AN ELECTRONIC DOCUMENT

1. TECHNICAL FIELD

This disclosure relates generally to lead nurturing, and more particularly to techniques for generating, tracking, and nurturing leads within an electronic document.

2. DISCUSSION OF RELATED ART

Lead generation, tracking, and nurturing is one of the core aspects of any marketing solution since it is used to generate content from which a list of potential customers can be derived. The content can be streamed to a sales team for converting these potential customers into paying customers.

Without leads, or more particularly, without the right leads, a sales team cannot be very effective. Business-to-Business (B2B) marketers believe lead generation is likely their most important marketing goal. Top priorities for B2B professionals include increasing the quality of leads and the volume of leads. Most B2B marketers use content marketing to generate leads and most B2B companies say content marketing generates more leads than traditional marketing strategies. Thus, there is a need for a mechanism through which lead generation is made more intelligent, personal, and effective.

Through online advertisers and search engines, a small business can cost-effectively target its primary demographic without having to purchase leads and without having to engage in costly market research. Online advertisers and search engines usually have extensive databases that a business can use to identify its primary demographic and thereby direct a marketing campaign to such persons. However, a shortcoming of such marketing is the low conversion rate that results. Consequently, online advertising and search engine marketing usually results in poor value-to-volume ratios.

Another form of online marketing involves using promotional tools and services such as those provided by e-commerce providers such as GroupOn (www.groupon.com). These providers facilitate businesses to market promotions to their primary demographic with a higher value-to-volume ratio. Specifically, promotions are sent to a set of leads and if a lead is interested in the promotion, that lead is able to purchase the promotion which can then be redeemed for a good or service at a future time.

Marketing through e-commerce providers still does not address the issue of client loyalty and client retention. In some instances, these forms of marketing actually promote the opposite behavior by appealing to clientele seeking the best current promotion or onetime transactions.

Leads may also be generated by monitoring a user's interaction with a marketer's website. For example, a score can be calculated for a user and incremented by a set amount each time the user interacts with a certain part of the website. The score may be incremented further if the user downloads a document from the website. The user is considered a potential lead if their score is greater than a preset value. However, the incremented score is merely an indicator of how often the user accesses the site and not an indicator of any level of further interests the user may have on the site's contents.

Thus, there are several technical problems with regard to conventional systems that generate promising leads.

SUMMARY

According to an aspect of the disclosure, leads are generated and nurtured by monitoring a user's (e.g., a customer user) activities and consumption behavior after the user downloads information from the marketer, e.g., a brochure or a white paper on a product.

A cloud-based system for nurturing leads is described, the system may include a cloud-based service configured to execute on a server and connect to a plurality of client devices over a computer network, the client devices including a marketer device and a customer device, the marketer device including an editor program comprising a graphical user interface (GUI) configured to enable a marketer user to generate initial content and contextual content, and specify a condition with respect to the initial content, and transmit information comprising the initial content, the contextual content, and the condition across the computer network to the cloud-based service, wherein the cloud-based service is configured to generate an electronic file including the initial content and executable code in response to the transmitted information, wherein the initial content is presented on a display of the customer device when the electronic file is opened by a reader program of the customer device, wherein the reader program executes an instruction of the executable code to monitor interaction of a customer user of the customer device with the initial content to determine whether the condition has been satisfied, and wherein the reader program executes an instruction of the executable code to present the contextual content on the display and notify the cloud-based service that the customer user is a possible lead, when it is determined that the condition has been satisfied.

A computer-implemented method for nurturing leads is described, the method may include: opening, by a reader program of a customer device, an electronic file to present initial content of the electronic file on a display of the customer device, the electronic file further comprising contextual content and executable code; executing, by the reader program, an instruction of the executable code to monitor an interaction of a customer user of the customer device with the initial content to determine whether a condition has been satisfied; executing, by the reader program, an instruction of the executable code to present the contextual content on the display when it is determined that the condition has been satisfied; executing, by the reader program, an instruction of the executable code to set a flag within the electronic file when there is no network connection between the customer device and a server that is remote from the customer device; executing, by the reader program, an instruction of the executable code to determine whether the network connection between the customer device and the server has been established; and executing, by the reader program, an instruction of the executable code to notify the server that the condition has been satisfied when the flag is set and it is determined that the network connection between the customer device and the server has been established.

A server for nurturing leads is described, the server includes a memory storing a first computer program and a second computer program; a network interface for communicating with a computer network; a processor configured to execute the first and second computer programs, wherein the first computer program is configured to enable a marketer user of a marketer device connected to the computer network to remotely generate initial content, generate contextual content, and specify a condition with respect to the initial content, wherein the first computer program is further configured to generate an electronic file including the initial content and executable code including instructions for monitoring interactions of a customer user on a customer device with the initial content and sending a notification message from the customer device to the server based on the monitoring, wherein the second computer program is configured to transmit the contextual content across the computer network to the customer device in response to the notification message.

BRIEF DESCRIPTION OF THE DRAWINGS

The detailed description describes one or more embodiments with additionally specificity and detail through use of the accompanying drawings, briefly described below.

DETAILED DESCRIPTION OF THE EXEMPLARY EMBODIMENTS

Figure 1A:
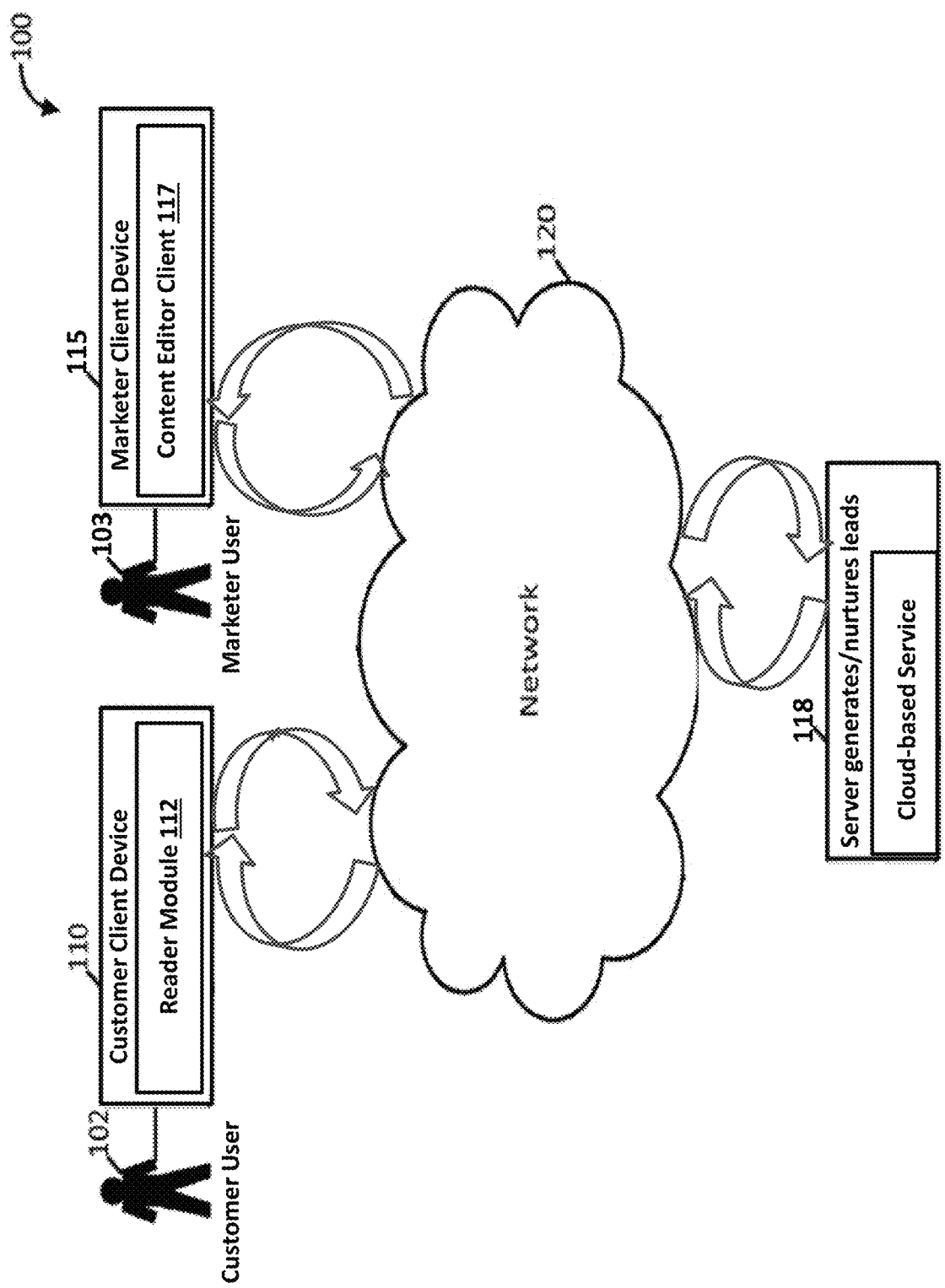
FIG. 1A is a block diagram illustrating a cloud-based system for generating and nurturing leads according to an exemplary embodiment of the invention.

One or more embodiments of the present disclosure include a cloud-based system for generating and nurturing leads using within-a document lead nurturing. The system may include a server that interfaces with an editing program of a marketer device to enable a marketer to generate initial content, specify a condition with respect to the consumption of the initial content, and generate contextual content that is to be presented when the condition is satisfied. The server generates an electronic file (e.g., document, a brochure, a guide, a whitepaper, etc.) including the initial content and executable code (e.g., JavaScript) configured to present the contextual content and notify the server of a potential lead when the condition is satisfied. If a customer user (e.g., the potential lead) uses a reader program (e.g., a PDF reader) of a customer device to open the electronic file, the reader program presents the initial content and executes instructions of the code to monitor interactions between the customer user and the initial content to determine whether the condition is satisfied (e.g., determines whether the customer user is sufficiently engaging with the initial content). If the customer user is determined to be sufficiently engaged, instructions of the code present the contextual content and potentially inform the server that the customer user is a lead.

For example, the customer user can be treated as a lead merely for triggering presentation of the contextual content. Alternately, the contextual content can include interactive content (e.g., selectable buttons, a poll, etc.), where the code informs the server that the customer user is a lead when the system determines that the customer user has sufficiently engaged with the interactive content.

Leads generated by embodiments of the disclosure are typically of a higher quality, are more ready to buy, and more likely to buy than leads generated by conventional leads generation tools.

Further, embodiments of the disclosure allow a potential lead to be scored based on both their interactions with pages of a website of the marketer and their interactions with documents they download from the website. For example, a customer user may not achieve a score that is high enough to be considered a lead when scored based on only her interactions with the website. Thus, embodiments of the disclosure reduce the chances of mischaracterizing a customer user as a non-lead.

Additionally, embodiments of the disclosure increase the chances of turning a potential lead into an actual lead since they provide lead nurturing. For example, an electronic file generated by a server of the disclosure is capable of dynamically determining a customer user's interest level based on that user's consumption of content within the document, and nurturing this interest by presenting additional on-point content (i.e., the contextual content) to the customer user when their interest level exceeds a certain threshold. Further, when the contextual content is interactive, additional information gleaned from their subsequent interactions with the interactive content can be used to more accurately assess whether the customer user should be considered an actual lead that needs to be contacted.

The following terms are used throughout the present disclosure:

The term "marketer device" may refer to a computer (e.g., desktop computer, a laptop computer, a tablet, a smartphone, etc.) used by the marketer to create marketing content providing information on products or services.

The term "customer device" is also a computer that may be similar to the computer used to implement the marketer device. The customer device is used by a potential lead to access (e.g., download) electronic files from the Web.

The term "editor program" (e.g., client application program or interface) may refer to a computer program located on the marketer device for creating marketing content providing with in-a-document lead nurturing. The marketing content includes initial content (e.g., text, images, video, audio, etc.) and contextual content (e.g., text, images, video, audio, etc.).

The term "initial content" may refer to a document or audiovisual image designed to be presented on a display when a customer opens the marketing content. For example, a brochure, a white paper, a guide, etc., on a product or service may be presented to the customer user. The initial content may be presented in the form of multimedia, graphics, images, videos, text, audio, links (e.g., hyperlinks), headings, tables, graphs, etc.

The term "contextual content" may refer to items (e.g., text, images, video, audio, etc.) presented to the customer if the customer's interactions with the initial content satisfies a certain condition. The contextual content may be presented in the form of a graphical button, a poll, etc. and may be presented for access interactively by the customer. The certain condition is a consumption condition with respect to the initial content. Examples of the consumption condition include but are not limited to a customer user highlighting/ commenting/annotating a specific area of the initial content, sharing the electronic file, reading part of the initial content at a certain speed, clicking a hyperlink within the initial content, zooming in on an image within the initial content, searching for a certain term within the initial content, selecting a table of contents item within the initial content, spending a certain amount of time on a section or image within the initial content, interacting with a multimedia element within the initial content, revisiting a page of the initial content a certain number of times, copying part of the initial content, etc.

The term "electronic file" may refer to a file generated by the marketer designed to be downloaded by the customer. The electronic file includes initial content along with executable code (or interpretative code) for monitoring the customer's interactions with the initial content. The executable code may include code from a programming and/or scripting language such as JAVASCRIPT, JAVA, PYTHON, PHP, C#, etc. The electronic file may have various formats such as a postscript format (PS), a portable document format (PDF), a MICROSOFT WORD (MS WORD) format, a WORDPERFECT format (WPD), a GOOGLE document format (e.g., Google Docs), a rich text format (RFT), a hypertext markup language format (HTML), etc. The reader program is located on the customer device and is used by the potential lead to open the electronic file. The reader program may include a PDF reader (e.g., ADOBE ACROBAT READER, FOXIT READER, JAVELIN PDF READER, GOOGLE DRIVE, a Web Browser, etc.), or any another program designed to a read an electronic file including content and an embedded script/code and execute the script/code (e.g., MS WORD).

FIG. 1A is a block diagram illustrating a cloud-based system for automatically generating and nurturing leads according to an exemplary embodiment of the invention.

As shown in FIG. 1A, the system 100 includes a marketer client device 115, a customer client device 110, a server 118 for generating and nurturing leads, and a communication network 120. The marketer client device 115 (e.g., a marketer device) may include a content editor client 117 (e.g., an editor program). The customer client device 110 (e.g., a customer device) may include a reader module 112 (e.g., a reader program). A marketer user 103 (e.g., an individual interested in generated marketing content) is illustrated as being a user of the marketer client device 115 of the system 100. A customer user 102 (e.g., a possible lead) is illustrated as being a user of the customer client device 110 of the system 100. In an exemplary embodiment, the marketer user 103 uses a browser of the marketer client device 115 to navigate to a website, downloads a plugin/extension from the website that installs the editor client 117 onto the marketer client device 115. The plugin/extension may become part of the browser. In another exemplary embodiment, the marketer user 103 uses the browser of the marketer client device 115 to navigate to a website, downloads an executable from the website that installs the content editor client 117 (e.g., a computer program) as a standalone application that can be later launched by the marketer user 103.

While a single customer user 102 and a single marketer user 103 is illustrated, the system 100 is not limited thereto, and may include multiple users of each type. While a single customer client device 110 and a single marketer client device 115 are illustrated, the system 100 is not limited thereto, and may include multiple client devices of each type.

Each of the customer client device 110, the marketer client device 115, and the server 118 and at least some portion of the communication network 120 are or include one or more programmable devices. These programmable devices may be any of a variety of standardized and special purpose devices, such as personal computers, workstations, servers, cellular telephones, and personal digital assistants. Broadly stated, the network 120 may include any communication network through which programmable devices may exchange information. For example, the network 120 may be a public network, such as the Internet, that is implemented with various IP-based network forwarding devices. The network 120 may also be or include other public or private networks such as LANs, WANs, cellular networks, extranets and intranets.

In some embodiments, the network 120 is configured to communicate (e.g., transmit or receive) information with connected programmable devices, such as the customer client device 110, the marketer client device 115, and the server 118. The network 120 may be configured to communicate both synchronous information streams and asynchronous information packets. When executing according to its configuration in one example, the network 120 receives streams including requests (e.g., request to connect to content editor module), content data (e.g., initial content and contextual content), mapping information (e.g., a mapping between a part of the initial content and the contextual content), condition information (e.g., conditions for displaying the contextual context) from the marketer client device 115 for transmission to the server 118, receives status/ acknowledgements (e.g., status indicating connection with content editor module has been established) from the server 118 for transmission to the marketer client device 115, receives notifications (e.g., notifying that a consumption condition has been satisfied) from the customer client device 110 for transmission to the server 118, receiving contextual content from server 118 for transmission to the customer client device 110, etc.

In some embodiments illustrated by FIG. 1A the marketer client device 115 is configured to execute one or more processes that support a communication session between the marketer client device 115 and the server 118, and the customer client device 110 is configured to execute one or more processes that support a communication session between the customer client device 110 and the server 118. In these embodiments, the marketer client device 115 is configured to execute one or more processes that transmit packets that may include content data, requests, mapping information, and condition information to the server 118, and the customer client device 110 is configured to execute one or more processes that transmit packets that may include notification information (i.e. notifying of consumption of certain content, of satisfying certain conditions, identify a customer user consuming the content or satisfying the condition, identifying section of content in which condition was satisfied, etc.). When executing according to these configurations, the customer client device 110 and the marketer client device 115 implements a variety of components described below with reference to FIG. 2.

Figure 1B:
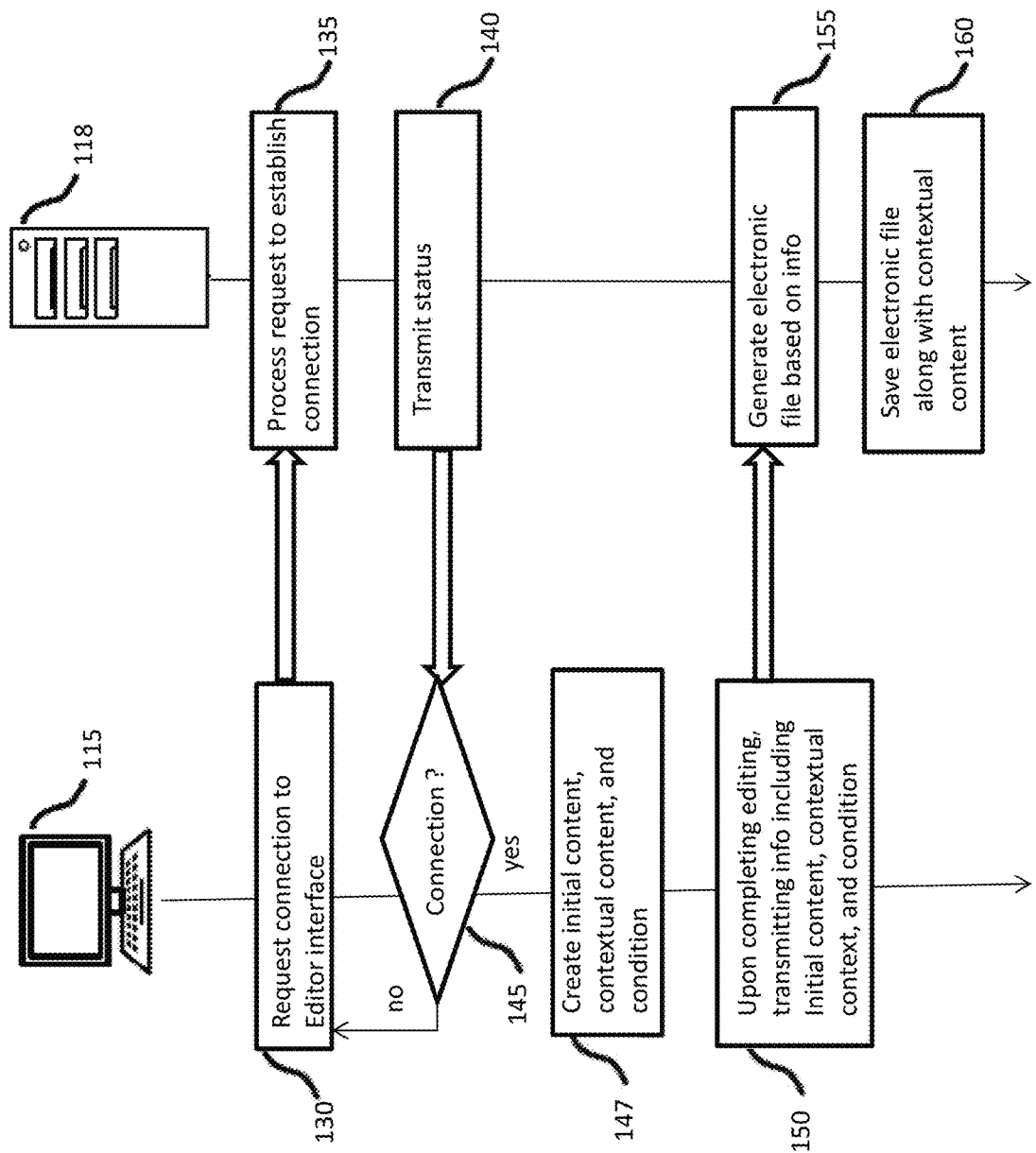
FIG. 1B shows an exemplary workflow between a marketer client device (marketer device) and a server of the system according to an exemplary embodiment of the invention.

FIG. 1B illustrates an exemplary workflow between the marketer client device 115 and the server 118 to create an electronic the including initial content for a customer user 102 (e.g., a prospective lead), contextual content associated with the initial content, and a condition for presenting the contextual content, where the electronic file, when opened by reader module 112 (e.g., ADOBE ACROBAT®), monitors consumption of the initial content and notifies the server 118 when the consumption satisfies the condition. The workflow of FIG. 1B assumes that the content editor client 117 has already been installed on the marketer client device 115, and the editor client 117 has been launched by the marketer user 103.

The workflow of FIG. 1B includes the editor client 117 of the marketer client device 115 requesting a connection to a content editor of the server 118 (step 130). For example, the editor client 117 may transmit a request across the network 120 to the server 118 requesting permission to connect to a content editor of the server 118 so the marketer user 103 can use its editing functions to create content (e.g., marketing content).

The workflow of FIG. 1B further includes the server 118 processing the request to establish a connection between itself and the content editor client 117 (step 135).

The workflow of FIG. 1B may further include the server 118 transmitting status information to the content editor client 117 indicating whether the connection could be established (step 140). For example, the status information could indicate that the connection could be established or that the connection could not be established.

The workflow of FIG. 1B further includes the content editor client 117 determining from the status information whether the connection has been established (step 145). If the status information indicates the connection could not be established, the workflow can resume to step 130 or exit. If the status information indicates the connection has been established, the content editor client 117 enables the marketer user 103 to create the content.

When the connection is established, the content editor client 117 may receive data from the server 118 enabling the content editor client 117 to present a graphical user interface (GUI) that includes fields, graphics, menus, etc. to enable the marketer user 103 to perform editing functions supported by a content editor of the server 118

The workflow of FIG. 1B further includes the marketer user 103 using the content editor client content 117 (e.g., through the GUI) to create initial content, contextual content, and a condition (step 147). The initial content may include various items including multimedia items, graphics, images, videos, text, audio, links (e.g., hyperlinks), headings, tables, graphs, etc. The initial content is the content that a user (e.g., customer user 102) would normally see before the condition is satisfied. For example, the GUI could include a first window used by the marketer user 103 to insert one of the above-described items to build the initial content. The contextual content may include one of the above-described items and/or interactive content such as selectable buttons, lists, polls, etc., where the contextual content is only presented when the condition is satisfied. For example, the GUI could include a second window used by the marketer user 103 to insert the items to build the contextual content. The GUI may include a function that enables the marketer user 103 to select from pre-defined templates so that the contextual content may be created more quickly. The condition could be selected by the marketer user 103 from a list of available conditions present in the GUI and then associated with the initial content and the contextual content or associated with a section of the initial content and the contextual content. For example, upon selecting one of the available conditions, the GUI could prompt the user to use a mouse to draw a box around the section of the initial content that is to be associated with the selected condition and the contextual content. The GUI may also be configured to enable the marketer user 103 to create multiple contextual contents and associate respective sections of the initial content with a respective one of the contextual contents.

In an exemplary embodiment, the condition is satisfied when the initial content or a section of the initial content is read carefully. For example, if the user (e.g., customer user 102) spends more than a certain amount of time on each page of the initial content, it could be concluded that the condition has been satisfied. For example, each time the user (e.g., customer user 102) scrolls to a new page, a timer can be started to determine whether the user has spent enough time on the page. The timer can be triggered by an event handler attached to a scrolling element (e.g., scrollbar) of an electronic document that presents the initial content. For example, each time the scrolling element scrolls to a position of a new page, a timer can be started.

In an exemplary embodiment, the condition is satisfied when the initial content is skimmed. For example, the GUI could be configured to allow the marketer user 103 to indicate the minimum sections or pages a user (e.g., customer user 102) needs to read to trigger display of the contextual content.

In an exemplary embodiment, the condition is satisfied when a user (e.g., customer user 102) spends more than a certain amount of time on a certain part or page of the initial content.

In exemplary embodiment, the condition is satisfied when the initial content or a section of the initial content is read at a particular reading speed. For example, the GUI could be configured to allow the marketer user 103 to specify a reading speed or a reading speed range to associated with the initial content or a section of the initial content and the contextual content. For example, the condition would be satisfied if a user (e.g., customer user 102) scrolls through the initial content or the section at the specified reading speed or at a speed within the specified reading speed range.

In an exemplary embodiment, the condition is satisfied when the initial content or a section of the initial content is read more than a certain number of times. For example, the GUI could be configured to allow the marketer user 103 to specify the number and associate the number with the initial content or a certain section of the initial content. For example, a counter can be incremented each time the user (e.g., customer user 102) scrolls to the certain section, and the condition is satisfied when a count of the counter is equal to or greater than the certain number.

In an exemplary embodiment, the condition is satisfied when a certain link (e.g., a hyperlink) of the initial content is selected by a user (e.g., customer user 102). The link may be used to automatically jump to another section within the initial content or to present another document from a website address included within the link. For example, the marketer user 103 could have previously used the content editor client 117 to insert several links into the initial content. A link may include text or graphics. For example, the GUI could be configured to allow the marketer user 103 to select one of the links in the initial content to be associated with the contextual content, where the condition is satisfied when the selected link is selected.

In an exemplary embodiment, the condition is satisfied when a certain image within the initial content is zoomed in on by a user (e.g., customer user 102). For example, the GUI could be configured to allow the user to select one of the images in the initial content to be associated with the contextual content, where the condition is satisfied when a user (e.g., customer user 102) uses a zooming function of the reader module 112 to zoom in on the selected image.

In an exemplary embodiment, the condition is satisfied when a certain keyword or a set of keywords are searched on within the initial content. For example, the GUI could be configured to allow the marketer user 103 to enter one or more keywords to associate with the initial content, where the condition is satisfied when a user (e.g., customer user 102) uses a searching function of the reader module 112 to search on one of the entered keywords. For example, the GUI could be configured to allow the marketer user 103 to enter a set of keywords to associate with the initial content, where the condition is satisfied after a user (e.g., customer user 102) uses a searching function of the reader module 112 to search on each of the keywords of the set.

In an exemplary embodiment, the condition is satisfied when a certain table of content (TOC) or heading item of the initial content is selected. For example, the marketer user 103 could have previously used the editor client 117 to insert certain a TOC or heading item into the initial content that represents different sections. For example, the GUI could be configured to allow the marketer user 103 to associate one of the items with the contextual content, where the condition is satisfied when the user 103 selects the associated one item.

The initial content may include various multimedia elements including a still image, a video, an animated graphic, a graph, a table, audio, and various charts. In an exemplary embodiment, the condition is satisfied when a user (e.g., customer user 102) interacts with a given multimedia element. For example, the GUI could be configured to allow the user 103 to associate an audio or video multimedia element of the initial content with the contextual content, where the condition is satisfied when a user (e.g., customer user 102) plays the associated multimedia element.

In an exemplary embodiment, the condition is satisfied when a user (e.g., customer user 102) copies content of the initial content or copies a certain section of the initial content. For example, the GUI could be configured to enable the marketer user 103 to associate a copy condition with the initial content or with a certain section of the initial content, where the condition is satisfied when a user (e.g., customer user 102) uses a copy function of the reader module 112 to copy all or part of the initial content or all or part of the section.

In an exemplary embodiment, the condition is satisfied when a user (e.g., customer user 102) highlights the initial content, or adds comments or annotations to the initial content, or performs this action within a certain part of the initial content. For example, the GUI could be configured to enable the marketer user 103 to associate a highlight, comment, or annotate condition with the initial content or a part of the initial content, where the condition is satisfied when a user (e.g., customer user 102) uses a highlight, comment, or annotate function of the reader module 112 on the initial content or the part.

In an exemplary embodiment, the condition is satisfied when a user (e.g., customer user 102) shares the initial content. For example, the GUI could be configured to enable the marketer user 103 to associate a share condition with the initial content, where the condition is satisfied when a user (e.g., customer user 102) uses a share function of the reader module 112 to share the initial content with one of their contacts or through social media (e.g., TWITTER, FACEBOOK, INSTAGRAM, PINTEREST, etc.).

In an exemplary embodiment, the condition is a compound condition including multiple sub-conditions. For example, the GUI could be configured to enable the marketer user 103 to present contextual content if the customer user 102 spends more than a certain amount of time on a certain part (e.g., a page) of the initial content and revisits the page more than a certain amount of times.

The workflow of FIG. 1B then includes the editor interface 208 generating an electronic file based on the received information (step 155). In an exemplary embodiment, the electronic file has a portable document format (PDF) including the initial content and additional executable code or interpretative code (e.g., JAVASCRIPT embedded into the PDF). However, the electronic file is not limited to any particular format. For example, the electronic file could be an InDesign the or a WORD file. The code may include instructions that are executed when the initial content is presented to monitor consumption of the initial content by a user (e.g., customer user 102) to determine whether a condition associated with the initial content has been satisfied, and then if the condition is satisfied, reports information to the server 118 information indicating that the condition has been satisfied and identifying information of the customer user 102 (e.g., the potential lead) that caused the condition to be satisfied. The initial content may be presented when the electronic the is opened by the reader module 112 of the customer client device 110, where the reader module 112 executes instructions of the code to perform the monitoring and the notifying.

The workflow of FIG. 1B further includes the editor interface 208 saving the electronic file along with the contextual content (step 160). For example, mapping information indicating the mapping between the initial content (or a section of the initial content) and the contextual content may be received from the marketer client device 115 during step 150 or automatically generated by the server 118, where the saving includes saving the mapping information. For example, a memory device of the server 118 may store the electronic file, the context content associated with initial content within the electronic file, and the mapping information.

In an exemplary embodiment, the electronic file is generated to include both the initial content and the contextual content so that contextual content can be accessed during an offline mode, which will be discussed in more detail below with respect to FIG. 1D. For example, if the electronic file is a PDF, the contextual content may be stored in a hidden part of the PDF such as a cabinet (CAB) file, so that a customer user 102 opening the electronic file with a PDF reader only views the initial content. A CAB file is an archive-file format that supports lossless data compression and embedded digital certificates used for maintaining archive integrity. The CAB file is merely provided as an example, as other file formats may be used to store the contextual content within the electronic file. The hidden part may also serve as a repository to record a user's (e.g., customer user 102) transactions with delivered messages and subsequently qualifying the document consumer (e.g., customer user 102) to a next level of lead nurturing within the document) In an exemplary embodiment, the executable code included within the electronic file has knowledge of the location of the contextual content within the electronic file so it can locally retrieve the contextual content when needed during the offline mode.

Figure 1C:
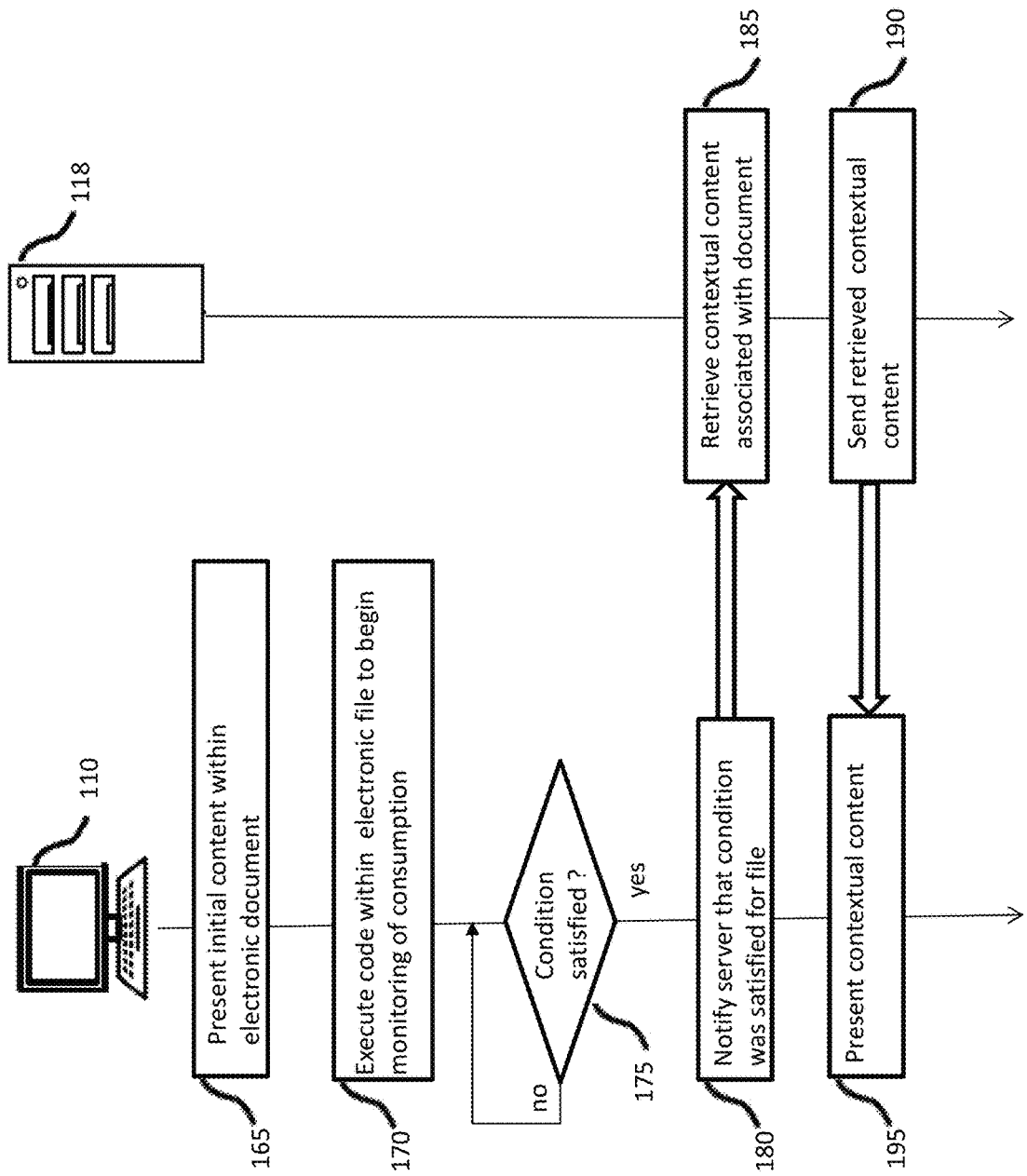
FIG. 1C shows an exemplary workflow between a customer client device (customer device) and a server of the system according to an exemplary embodiment of the invention.

FIG. 1C illustrates an exemplary workflow between the customer client device 110 and the server 118 to cause the contextual content to be presented. The workflow of FIG. 1C assumes that the electronic file has already been uploaded to a website of the marketer (e.g., by marketer user 103), the customer user 102 has used the browser of the customer client device 110 to navigate to the website and download the electronic the file, and opened the electronic the using the reader module 112. The workflow includes the reader module 112 presenting the initial content located within the electronic file (step 165). For example, the reader module 112 may create a graphical window on a display device of the customer client device 110 that includes the initial content. For example, the initial content may be a sales brochure that includes pictures of products and text that explains features of the products. However, the initial content is not limited thereto and could include various other documents such as a user guide or a white paper.

The workflow of FIG. 1C further includes the reader module 112 executing instructions of the code within the electronic file to begin monitoring of consumption of the initial content (step 170). The monitoring could include creating event handlers to monitor keys pressed, mouse buttons selected, functions performed (e.g., copy function, share function), and objects (e.g., sliders) interacted with, and creating timers.

The workflow of FIG. 1C further includes determining whether a condition associated with the initial content (or a part of the initial content) has been satisfied based on the monitoring (step 175). For example, the customer user 102 could be considered a potential lead if the condition is satisfied. If the condition is not satisfied, the workflow of FIG. 1C can resume to step 175 to continue the monitoring.

If the condition is satisfied, the workflow of FIG. 1C further includes notifying the server 118 (step 180). The notifying may include the code (or an executed instruction of code) sending a notification message to the server 118 identifying the electronic document or content that was viewed, identifying the customer user that viewed the electronic document or content, and identifying the condition that was satisfied. For example, the notification message could include user identification (ID) information such as an email address of the user (e.g., customer user 102) and a document ID identifying the electronic the including the initial content that was viewed. The ID information could also be a device identifier such as an internet protocol (IP) address or a MAC address. The notification message may also include a condition ID identifying the condition that was satisfied. If the condition was associated with a particular section or item (e.g., a hyperlink, an image, a heading, etc.) within the electronic file, the notification message may include an ID identifying the section or the item.

The workflow of FIG. 1C further includes the server 118 retrieving the contextual content that is associated with the electronic file indicated by the notification message (step 185). For example, the server 118 may use the ID of the electronic file or section received in the notification message to index its stored mapping information to determine and load corresponding contextual content. When the electronic the includes multiple sections (e.g., a part of the document, a headers, a multimedia item, etc.) each associated with a different one of a plurality contextual contents, the notification message may additionally include an ID of the section in which the condition was satisfied so that the server 118 can use the ID to select contextual content from among the plurality of contextual contents associated with the electronic the and load the selected contextual content.

The workflow of FIG. 1C further includes the server 118 sending the retrieved contextual content to the customer client device 110 (step 190). For example, the server 118 can transmit the contextual content across the network 120 to the customer client device 110.

The workflow of FIG. 1C further includes the customer client device 110 presenting the received contextual content (step 195). For example, the customer client device 110 may overlay the initial content with the received contextual content. For example, the reader module 112 may create a pop-up menu that includes the contextual content and present the pop-up menu over a part or section of the initial content that is part of the condition that was satisfied.

The workflow of FIG. 1C assumes that the customer client device 110 is online (i.e., connected to the network 120. However, if the customer client device 110 were to lose its connection to the network 120, the customer client device 110 is not able to notify the server 118 that the consumption condition with respect to the initial content was satisfied. Further, even if the customer client device 110 is able to provide the notification, but the customer client device 110 then loses its connection to the network 120, the customer client device 110 would not receive the corresponding contextual content that it needs to present.

Figure 1D:
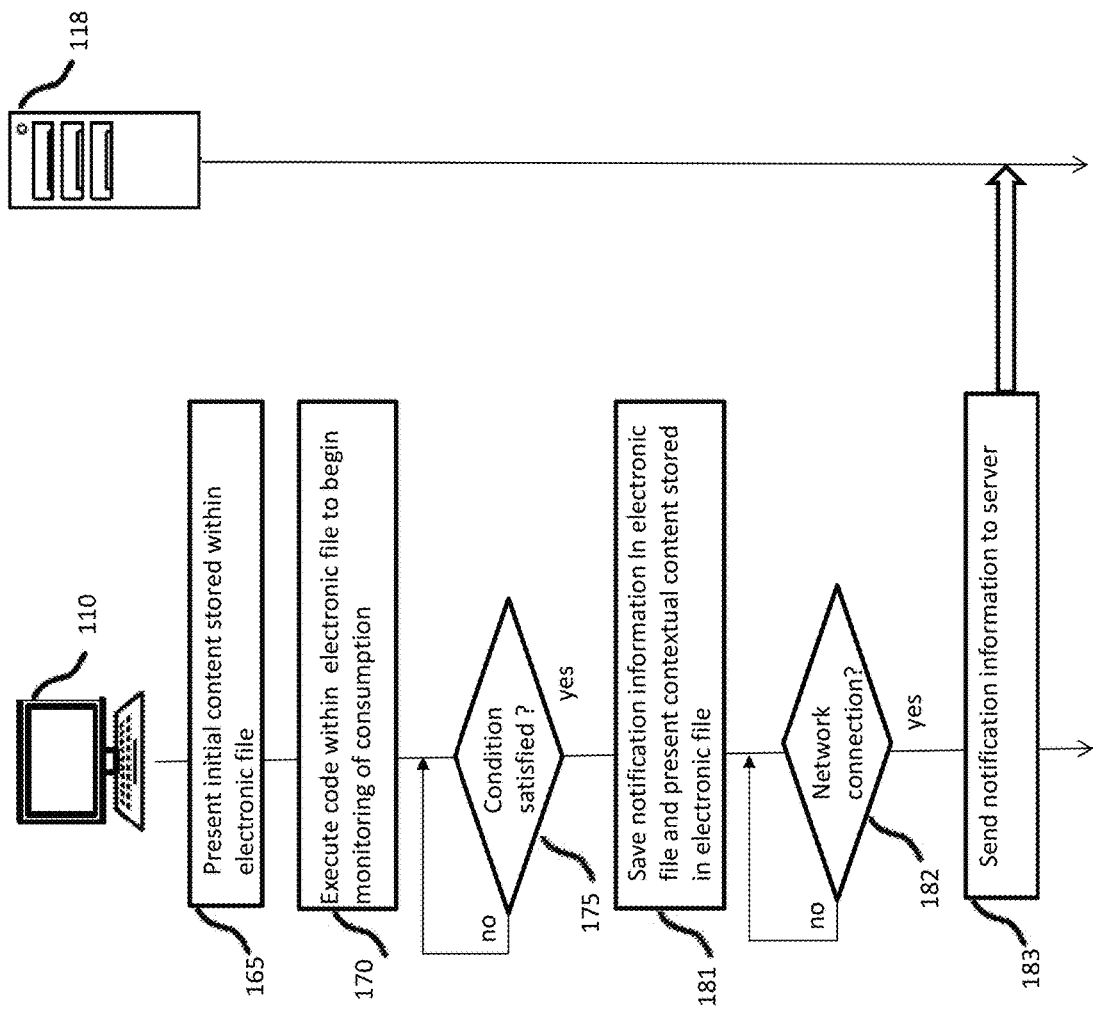
FIG. 1D shown another exemplary workflow between a customer device and a server of the system according to an exemplary embodiment of the invention.

The workflow of FIG. 1D provides an embodiment that works mostly in an offline mode, but then notifies the server 118 of a potential lead upon reconnecting to the network 120. The workflow assumes that the code of the electronic file generated by step 155 includes the contextual content(s). Thus, the code executed by the customer client device 110 does not need to rely on the server 118 later providing the contextual content(s).

The workflow of FIG. 1D includes the steps 165, 170, and 175 of the workflow of FIG. 1C, however the electronic file additionally includes the contextual content(s).

The workflow of FIG. 1D further includes, upon determining that the condition was satisfied saving notification information in the electronic file, and presenting the contextual content stored in the electronic the associated with the satisfied condition (step 181). For example, as discussed above, the contextual content may be stored within a hidden section of the electronic the such as a CAB file. Thus, the notification information may also be stored in a part of the hidden section reserved for storing the notification information. For example, the notification information could include user identification (ID) information such as an email address of the user (e.g., customer user 102) and/or document ID information identifying the electronic the including the initial content that was viewed. The notification information may also include a condition ID identifying the condition that was satisfied. If the condition was associated with a particular section or item (e.g., a hyperlink, an image, a heading, etc.) within the electronic file, the notification message may include an ID identifying the section or the item. The notification information may include a flag that indicates whether condition was satisfied.

The workflow of FIG. 1D further includes checking for a connection to the network 120 (step 182). Since the user (e.g., customer user 102) whose consumption of the initial content triggered the presentation of contextual content, this user is a potential lead. However, if the customer client device 110 is not currently connected to the network 120, it is not possible to share this information with the server 118. Thus, the code (e.g., instructions of the code) can periodically check to see if the customer client device 110 is connected to the network 120. When the code finally determines there is a connection to the network 120, the code transmits the notification information to the server 118 (step 183). The server 118 can assume that the customer user identified in the notification is a potential lead and store that information so a salesperson can later contact the user. In an alternate embodiment, the contextual content is interactive (e.g., a graphical button, a poll, etc.), and the user's (e.g. customer user 102) interactions (e.g., buttons clicked, choices selected in poll, etc.) with the contextual content determines whether the user is considered to be a potential lead.

Figure 2:
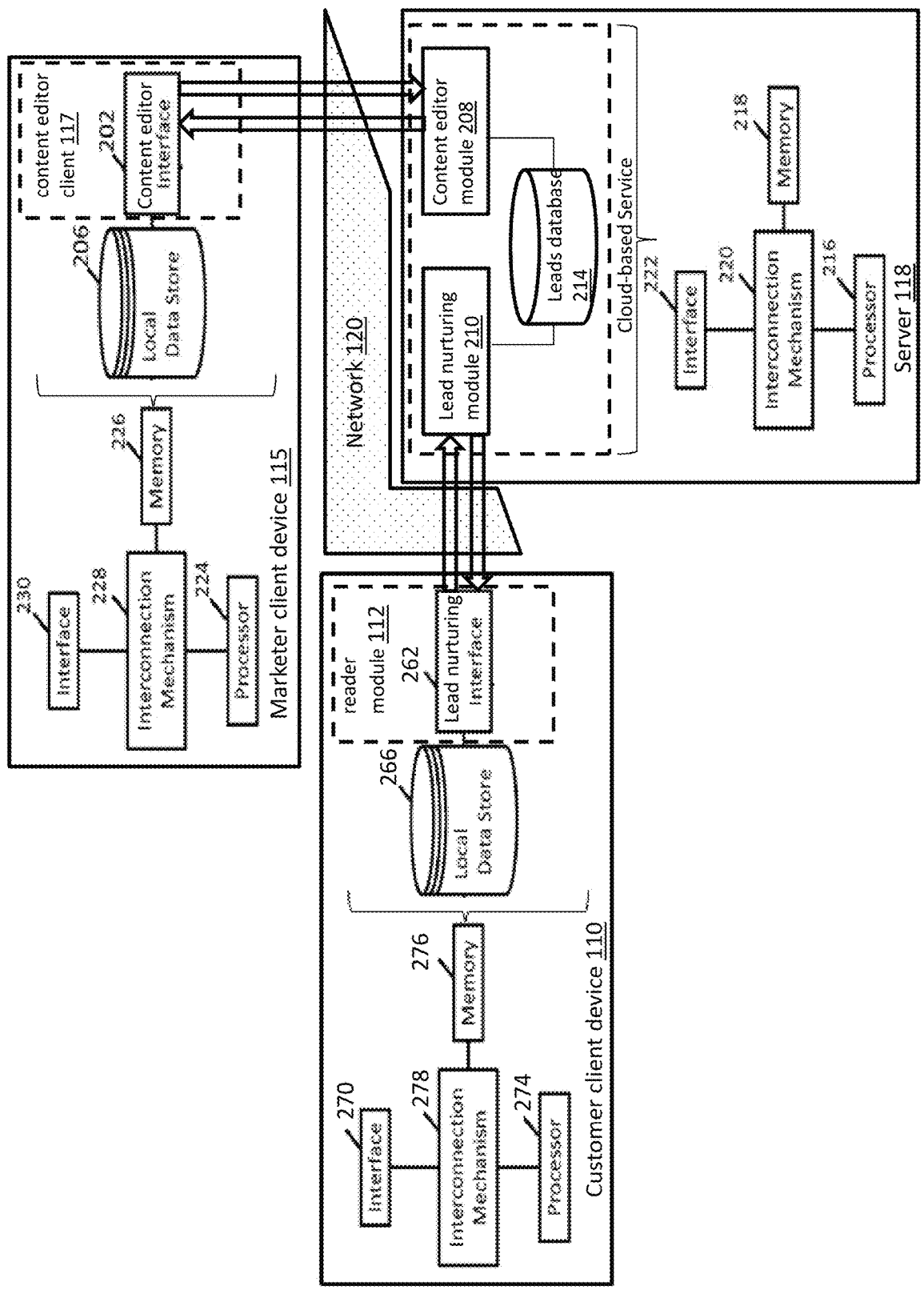
FIG. 2 is a block diagram illustrating an exemplary customer device, marketer device and server of the system according to exemplary embodiment of the invention.

FIG. 2 shows a more detailed view of the customer client device 110, the marketer client device 115 and the server 118. As shown in FIG. 2, the marketer client device 115 includes a processor 224, a memory 226, an interconnection mechanism 228, a content editor client 117, and a local data store 206 (e.g., a database). The customer client device 110 includes a processor 274, a memory 276, an interconnection mechanism 278, a reader module 112, and a local data store 266 (e.g., a database. The server 118 includes a processor 216, a memory 218, an interconnection mechanism 220, an interface 222, a lead nurturing module 210, an content editor module 208, and a leads database 214. The content editor client 117 includes a content editor interface 202. When the reader module 112 opens an electronic file, the code of the electronic file that the reader module 112 executes may be referred to as the lead nurturing interface 262.

As illustrated in FIG. 2, the server 118, the customer client device 110, and the marketer client device 115 each include a suite of components. These components are the processors 216, 224, and 274, the memory 218 226, and 276, the interconnection mechanisms 220, 228, and 278, and the interfaces 222, 230, and 270. Although the particular types and models of the standard components may vary between any two of the programmable devices described herein, it is appreciated that each programmable device includes a processor, memory, interconnection mechanism, and an interface as described below with reference to the server 118.

The interfaces 230 and 270 each include one or more physical interface devices such as input devices, output devices, and combination input/output devices and a software stack configured to drive operation of the devices. Interface devices may receive input or provide output. More particularly, output devices (e.g., display devices, printers, etc.) may render information for external presentation. Input devices may accept information from external sources. Examples of interface devices include keyboards, mouse devices, trackballs, microphones, touch screens, printing devices, display screens, speakers, accelerometers, network interface cards, etc. Interface devices allow programmable devices to exchange information and to communicate with external entities, such as users and other systems.

The interconnection mechanisms 228 is a communication coupling between the processor 224, the memory 226, and the interface 230. The interconnection mechanisms 278 is a communication coupling between the processor 274, the memory 276, and the interface 270. The interconnections mechanisms 228 and 278 may each include one or more physical busses in conformance with specialized or standard computing bus technologies such as IDE, SCSI, PCI, and InfiniBand. The interconnection mechanism 228 enables communications, including instructions and data, to be communicated between the processor 224, the memory 226, and the interface 230. The interconnection mechanism 278 enables communications, including instructions and data, to be communicated between the processor 274, the memory 276, and the interface 270.

The memory 226 and 276 each includes readable and/or writeable data storage that stores programs and data used or manipulated during operation of a programmable device. The programs stored in the memory 226 are a series of instructions that are executable by the processor 224. The programs stored in the memory 276 are a series of instructions that are executable by the processor 274. The memory 226 and 276 may each include relatively high performance data storage, such as registers, caches, dynamic random access memory, and static memory. The memory 226 and 276 may each further include a relatively low performance, non-volatile data storage medium such as flash memory or an optical or magnetic disk. Various embodiments may organize the memory 226 or 276 into particularized and, in some cases, unique structures to store data in support of the components disclosed herein. These data structures may be specifically configured to conserve storage space or increase data exchange performance and may be sized and organized to store values for particular data and types of data.

To implement specialized components of some embodiments, the processors 224 and 274 execute a series of instructions (i.e., one or more programs) that result in manipulated data. The processors 224 and 274 may be any type of processor, multiprocessor, microprocessor, or controller known in the art. The processor 224 is connected to and communicates data with the memory 226 and the interface 230 via the interconnection mechanism 228. The processor 274 is connected to and communicates data with the memory 276 and the interface 270 via the interconnection mechanism 278. In an embodiment, the processor 224 causes data to be read from a non-volatile (i.e., non-transitory) data storage medium in the memory 226 and written to high performance data storage. In an embodiment, the processor 274 causes data to be read from a non-volatile (i.e., non-transitory) data storage medium in the memory 276 and written to high performance data storage. The processors 224 and 274 manipulates the data within the high performance data storage, and copies the manipulated data to the data storage medium after processing is completed.

In addition to the standard suite of components described above, the server 118, the customer client device 110, and the marketer client device 115 includes several customized components. For example, the server 118 includes the lead nurturing module 210, the content editor module 208, and the leads database 214. In at least one embodiment, each of these customized components is implemented by the processor 216. As shown in FIG. 2, the customized components of the marketer client device 115 include the content editor client 117 and the local data store 206, and the customized components of the customer client device 110 include the reader module 112 and the local data store 266.

In an exemplary embodiment, the content editor interface 202 of the marketer client device 115 provides the marketer user 103 with a graphical user interface (GUI) when the marketer user 103 selects a graphical element from their Internet browser that was added to the browser. For example, the graphical element may include a dropdown menu with a selectable choice having a label such as "create within-a-document lead nurturing" that enables a marketer user 103 to generate an electronic file capable of tracking consumption of its content upon the marketer user 103 selecting the choice. In an alternate embodiment, the GUI is presented independent of the Internet browser when the marketer user 103 selects an icon on a display of the marketer client device 115 that launches the content editor client 117 as a standalone application.

The content editor interface 202 of the content editor client 117 establishes a connection with the content editor module 208 of the server 118. Once the connection has been established, the content editor client 117 can be used to create the initial content, the contextual content, and to specify a condition with respect to the consumption of the initial content that causes the contextual content to be displayed. The initial content, the contextual content, and the condition can be stored temporarily in the local data store 206. The content editor interface 202 can send information including the initial content, the contextual content, and the condition across the network 120 to the content editor service 208. The content editor interface 202 may additionally send mapping information indicating a mapping between a specific part of the initial content and the contextual content to the editor service 208. For example, if the condition is satisfied with respect to the specific part of the initial content in the mapping, then the contextual content in the mapping is presented. Alternatively, the content editor module 208 does not receive the mapping information from the context editor interface 202, and instead automatically generates this mapping information from analyzing the initial content and the contextual content(s). The content editor service 208 can use the received information (e.g., the initial content, the contextual content, the mapping information, and the condition) to generate the electronic the capable of tracking consumption of its content for storage in the leads database 214 or storage in another database or memory. For example, the electronic the may include the initial content and code (i.e., the lead nurturing interface 262) configured to monitor consumption of the initial content to determine whether the condition is satisfied, and transmit the notification message across the network 120 to the lead nurturing module 210 when the condition is satisfied. The content editor module 208 may additionally store the contextual content and the mapping information in the leads database 214 or another database or memory so that the contextual content can be retrieved and transmitted (pushed) across network 120 to the customer client device 110 on which the customer user 102 consumed the initial content. The leads nurturing module 210 can use information within the notification message to determine the identity of the customer user 102 and store this information in the leads database 214 as the identity of a potential lead.

In a further exemplary embodiment, the contextual content is interactive content, and the customer user 102 is not considered a potential lead until the customer user 102 sufficiently interacts with the interactive content. For example, the interactive content could be a pop-up menu with a selectable positive choice (e.g., "select to be contacted") and a selectable negative choice (e.g., "select to be left alone"), and then the lead nurturing interface 262 sends a response message across the network 120 to the lead nurturing module 210 indicating which of the choices was selected. For example, if the positive choice was selected, the customer user 102 is treated as potential lead in the database 214 so they can be later contacted by a salesperson. For example, the interactive content could be a poll that includes selectable yes/no questions, where the lead nurturing interface 262 sends the answers to the questions to the lead nurturing service 210, and the customer user 102 is treated as a potential lead based on how these answers compare to pre-defined answers.

To support an offline mode, the content editor module 208 may generate the electronic file so that it includes the contextual content in addition to the initial content, and the code (e.g., the lead nurturing interface 262) added to the electronic file retrieves this local contextual content when a condition related to the initial content is satisfied and presents the local contextual content on a display device of the customer client device 110. For example, the contextual content can be inserted into a hidden section of the electronic the that is not displayed when opened by a document reader (e.g., reader module 112). During the offline mode, the lead nurturing module 262 can store identifying information of the customer user 102 in the hidden section when the condition is satisfied, and after re-establishing a connection to the network 120 (online mode), transmit this information across the network 120 to the lead nurturing module 210 to inform the lead nurturing module 210 of the identity of a possible lead. If the contextual content is interactive content, the lead nurturing module 262 can store identifying information of the customer user 102 in the hidden section only when the condition is satisfied that presented the contextual content and the customer user 102 has sufficiently interacted with the contextual content.

As discussed above, the marketer user 103 can use the content editor client 117 to manually map respective sections of the initial content to respective contextual content. In an exemplary embodiment, to bypass any manual mapping of contextual content or to save on manual effort, an algorithm (e.g., a content intelligence engine) is used to intelligently parse the initial content. The content intelligence engine intelligently can divide the initial content into structures (or elements) of different structure types such as images, texts, form fields, email IDs, and/or signature fields. One or more elements generated from the dividing is then automatically mapped to corresponding contextual content that is available on the server 118. For example, the content intelligence engine could be implemented by an artificial neural network (ANN) such as a convolutional neural network (CNN). For example, the content intelligence engine may divide the initial content into pages or sections and map these pages or sections with corresponding portions of the contextual content (e.g., images, textual strings, polls, video streams, etc.). For example, when a page of the initial content is passed through the content intelligence engine, the engine analyzes the page with respect to the structure of the page and associated content of the page. For example, the ANN can automatically detect different structure types (e.g., images, texts, form fields, email IDs, and/or signature fields, and other multimedia types) that are present in the initial content, and perform an automatic mapping of those detected structures to appropriate contextual content to generate mapping information that maps the detected structures to respective contextual contents. For example, the ANN could have been previously trained on these difference structure types so it can identify them within a new document. The mapping information may be stored on the server 118. For example, when a customer client device 110 opens an electronic the including the initial content, code within the electronic file may determine that a condition with respect to one of these structures has been satisfied, the code may notify the server 118 of the identity of the structure (e.g., in a notification message), and the server 118 can reference the mapping information to load the corresponding contextual content and send that contextual content to the customer client device 110 so the customer client device 110 can display the received contextual content (e.g., in the form of app bezels, etc.).

Figure 3:
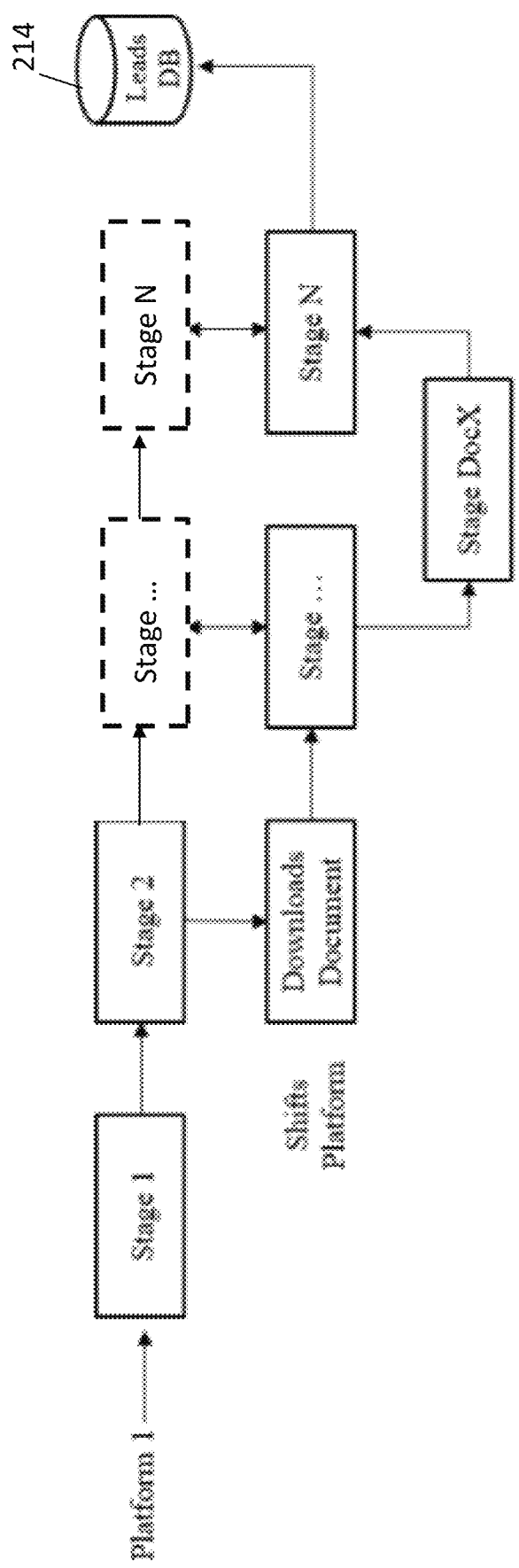
FIG. 3 illustrates a leads pipeline that may be implemented according an exemplary embodiment of the invention.

FIG. 3 illustrates a lead nurturing pipeline according to an exemplary embodiment of the invention that can generate leads. Each stage of the pipeline represents a different touch point for a customer user. For example, stage 1 could be a user visiting a website, stage 2 could be the customer user viewing a marketing video on the website, and stage . . . could be a customer user viewing additional content. Each touch point can be given a score, and a user's movement through different phases creates a leads pipeline. For example, if a customer user visits the website (stage 1) theft score can be incremented, and then if the customer user views the marketing video (stage 2) their score can be further incremented, but if the customer user downloads a conventional document from the website, further interactions of the user while consuming the document are no longer tracked and scoring becomes static. For example, if the customer user had not downloaded the document, and had instead remained on the website, they could have advanced to the dotted stages (e.g., State . . . and Stage N). However, if the user instead downloads an electronic the generated by the content editing client 117, further interactions of the user while consuming the file can be tracked. For example, even though the customer user 102 exits from the website and now opens the downloaded the on his mobile device or on his desktop computer, consumption of content within the file by the customer user 102 can still be tracked when the customer user 102 is online or offline. For example, the stage DocX could represent the customer user 102 interacting with the contextual content, and stage N could represent the user being added a potential lead to the leads database 214 to reaching the end of the lead pipeline. Thus, a score for the customer user 102 can be created from their interactions with the website of the marketer and their interactions with the downloaded file. For example, the score of the customer user 102 generated from their interactions with the website can be added to a score created for the customer user 102 based on the interactions with the initial content and/or the contextual content to generate a final score, and the customer user 102 is considered a lead if the final score is higher than a certain threshold.

Figure 4:
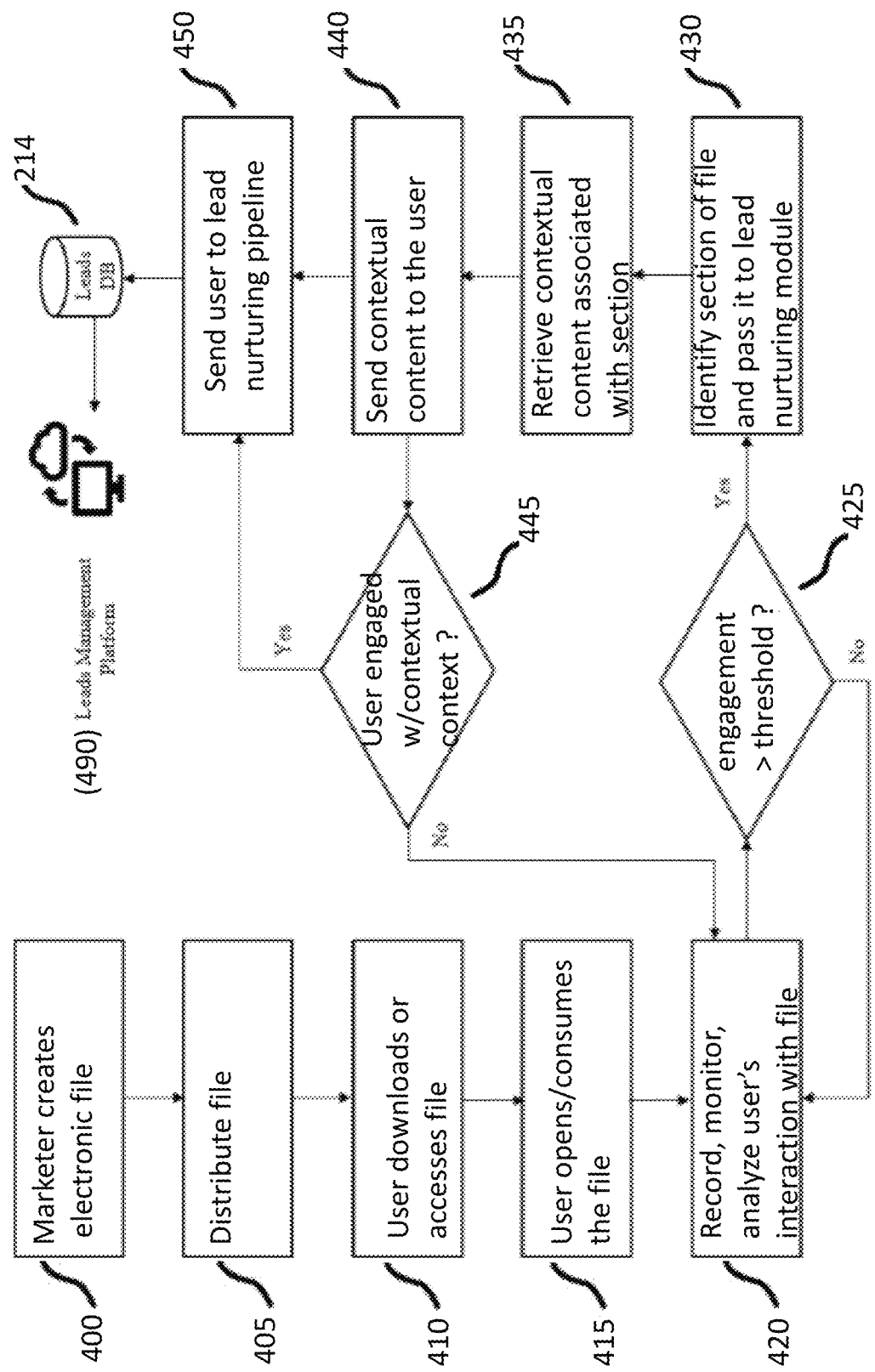
FIG. 4 illustrates a method for generating and nurturing leads according to an exemplary embodiment of the inventive concept.

FIG. 4 illustrates an end to end workflow according to an exemplary embodiment of the invention.

The workflow of FIG. 4 includes the marketer user 103 creating the electronic the (step 400). For example, the marketer user 103 can create the file using the content editor client 117.

The workflow of FIG. 4 includes the marketer user 103 distributing the file (step 405). For example, the marketer user 103 can upload the file to theft website so it can be accessed by potential customers, share the file with one or more of theft contacts, email the file to one or more of theft contacts, store the file in an accessible area managed by a the hosting service (e.g., DROPBOX), etc.

The workflow of FIG. 4 includes a customer user 102 downloading or accessing the electronic the (step 410). For example, customer user 102 could use the customer client device 110 to download the electronic file from the website or receive the file in a communication from the marketer user 103.

The workflow of FIG. 4 further includes the customer user 102 opening the electronic the (step 415). For example, the marketer user 102 could open the electronic file using the reader module 112.

The workflow of FIG. 4 further includes recording, monitoring, and analyzing the user's (e.g., customer user 102) interaction with the electronic the (step 420). For example, the opening of the electronic the may cause the reader module 112 to execute code (e.g., JAVASCRIPT) of the electronic file that monitors consumption of initial content within the electronic the to determine whether a given condition with respect to the consumption of the initial content has been satisfied. For example, if the condition is a certain reading speed or a certain number of times reading a certain page, the code (e.g., the lead nurturing interface 262) could monitor movements of a scrollbar of a window presented by the reader module 112 that includes the initial content.

The workflow of FIG. 4 further includes determining whether a level of engagement with the initial content has exceeded a threshold (step 425). For example, the level of engagement could be considered as exceeding the threshold when the condition is satisfied.

The workflow of FIG. 4 further includes identifying a section of the initial content of the electronic file whose consumption level exceeded the threshold, and sending information identifying the section to the lead nurturing module 210 (step 430). For example, the code (e.g., the lead nurturing interface 262) can send a notification message to the lead nurturing module 210 including a section ID of a section whose consumption exceeded the threshold and a user ID of the customer user 102 who participated in the consuming.

The workflow of FIG. 4 further includes retrieving contextual content that is associated with the section (step 435). For example, the lead nurturing module 210 can use the section ID to index mapping information to determine the corresponding contextual content.

The workflow of FIG. 4 further includes sending the contextual content to the customer user 102 (step 440). For example, the lead nurturing module 210 can transmit an electronic message including the contextual content across the network 120 to the lead nurturing interface 262. The lead nurturing interface 262 then presents the contextual content. For example, the initial content may be overlaid with a popup window including the contextual content.

The workflow of FIG. 4 further includes the lead nurturing interface 262 determining whether the customer user 102 has engaged with the context content (step 445). For example, if the contextual content is a selectable button (e.g., "select for more info"), then the customer user 102 has engaged if they have selected the button. For example, if the contextual content is a poll, then the customer user 102 has engaged if they have answered one or more of the questions or based on how theft answers compare to corresponding pre-defined answers.

If the customer user 102 has not engaged with the contextual content (e.g., selected a termination button to close the content or ignored the context for a certain amount of time), the workflow of FIG. 4 returns to step 420.

If the customer user 102 has engaged sufficiently with the contextual content, the workflow of FIG. 4 includes sending information identifying the customer user 102 as a potential lead to a nurturing pipeline for storage in a leads database 214 (step 450). A leads management platform 490 such as MARKETO can then access the leads in the leads database 214. For example, a user (e.g., a salesperson) of the leads management platform 490 may use of tool or function of the platform to view the leads of the leads database 490, so they can contact these leads. The leads database 214 may include contact information (e.g., email address, phone number, etc.) of each customer user 102 listed as a possible lead. A profile for each customer user 102 can be maintained and updated based how the user interacted with the initial content and/or the contextual content. The lead nurturing module 210 may record various parameters including the thresholds that triggered display of the contextual content(s), which contextual content(s) were shown to the customer user 102, what is the corresponding user's response, interaction, views, opinion, or feedback on each of the viewed content, and user profile information based on their path through the leads pipeline. All these parameters, responses, in combination with a user's profile, interests, etc., can then be transmitted to the lead management platform 490 for preparing contextually relevant, interest based offers to the viewers who are now part of the nurtured leads pipeline and handed over to the sales team for sales engagement.

Figure 5:
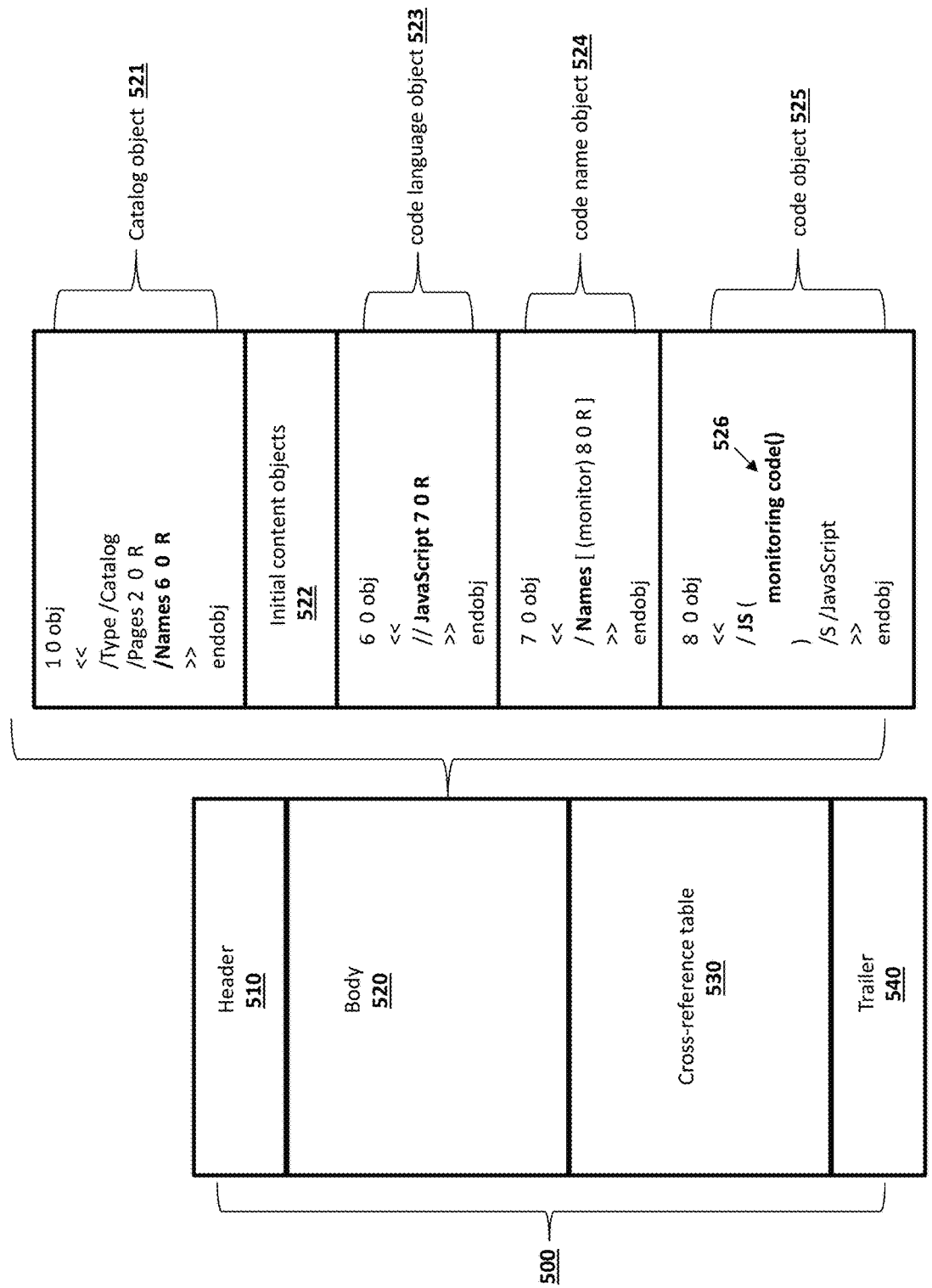
FIG. 5 illustrates an example of an electronic file that may be generated by an exemplary embodiment of the inventive concept to assist in generating leads.

FIG. 5 illustrates an example of an electronic file 500 that may be generated by an exemplary embodiment of the inventive concept to assist in generating leads. In this example, it is assumed that the electronic file 500 has a PDF format and is embedded with JavaScript code. However, the inventive concept is not limited to any particular file format or programming language as the electronic file 500 may have various formats and may use code from other programming languages. The electronic file 500 may include a header 510, a body 520, a cross-reference table 530, and a trailer 540. The header 510 states the PDF specification (e.g., PDF-1.0) that the file 500 follows, the body 510 contain all objects that make up the document (e.g., the initial content), the cross-reference table 530 lists the locations of indirect objects in the file 500, and the trailer 540 specifies the location of the cross reference table and other special objects.

The body 510 includes a catalog object 521, initial content objects 522, a code language object 523, a code name object 524, and a code object 525. For example, the initial contents object 522 may include one or more objects that enable a PDF reader to present the initial content. For example, these objects could define text or images of the initial content to display, a font of the text, etc. The code language object 523 is an indirect object that identifies the language or type of the code being used (e.g., JavaScript) and references the code name object 524. The code name object 524 is another indirect object that includes a name of the JavaScript code, and references the code object 525. In this example, 'monitor' is the name of the code. The name of 'monitor' is merely provided as an example, as the code can have various names. The code object 525 includes JavaScript code 536, which corresponds to the above-described executable code that is created by server 118 and used to monitor the interactions of the customer user 102 with the initial content, to notify the server 118 that the customer user 102 has satisfied certain condition(s) with respect to their consumption of the content and/or shown interest in certain parts of the initial content, to receive contextual content from the server 118, and to present the contextual content. During the offline mode, the code 536 additionally includes a local copy of the contextual content. The catalog object 521 references that initial contents objects 522 and the code name object 524. When a reader program (e.g., reader module 112) opens the file, it can reference the catalog object 521 to present the initial content and to execute the code 536.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. For example, the lead nurturing module 210, leads database 214, and the content editor module 208 may be located in the cloud or provided by a cloud-based service. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 6:
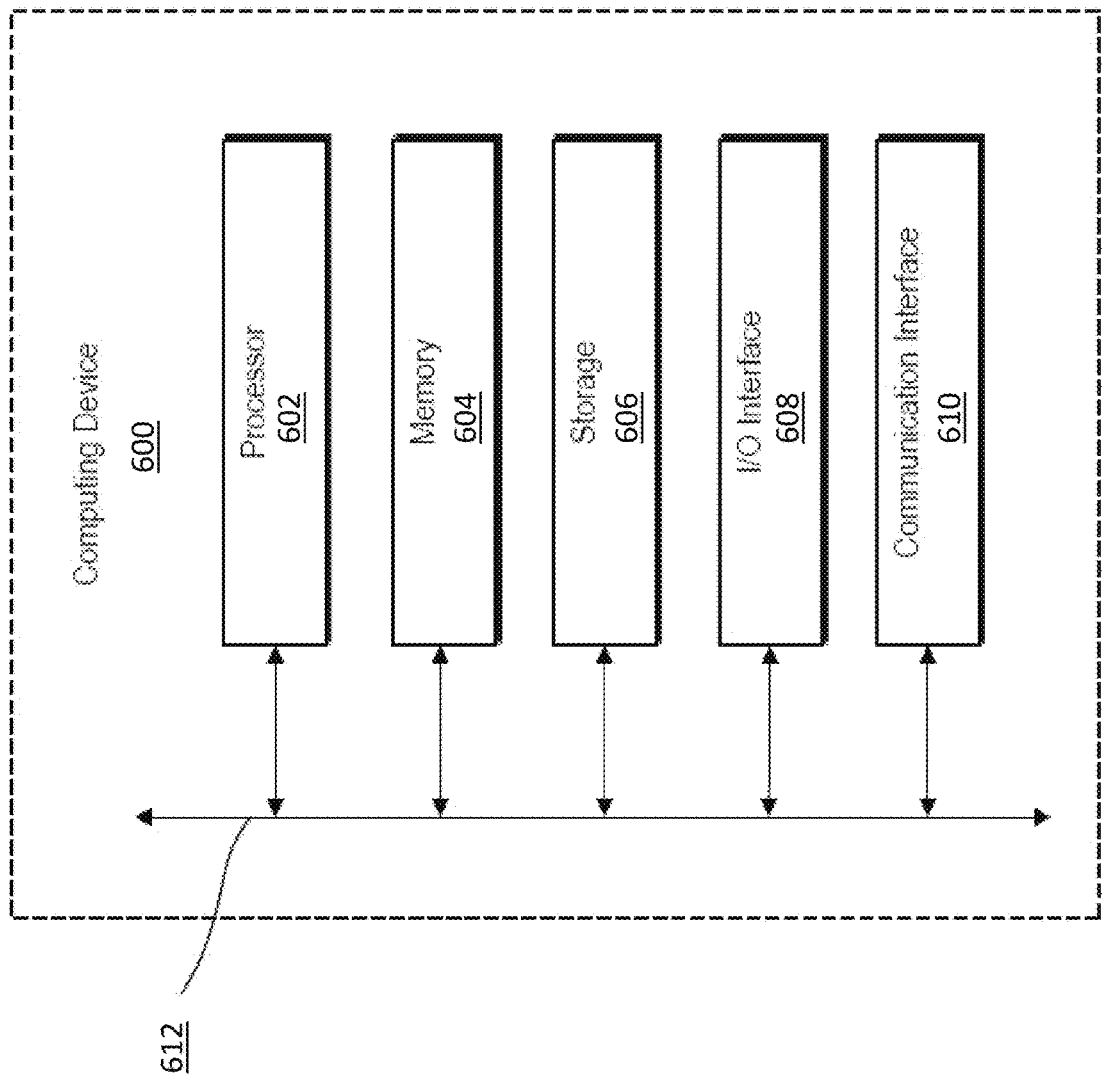
FIG. 6 illustrates an exemplary computing device that may be used to perform one or more methods of the disclosure.

FIG. 6 illustrates a block diagram of an example computing device 600 that may be configured to perform one or more of the processes described above. One will appreciate that one or more computing devices, such as the computing device 600 may represent the computing devices described above (e.g., client device 110/115 or the server 118). In one or more embodiments, the computing device 600 may be a mobile device (e.g., a mobile telephone, a smartphone, a PDA, a tablet, a laptop, a camera, a tracker, a watch, a wearable device, etc.). In some embodiments, the computing device 600 may be a non-mobile device (e.g., a desktop computer or another type of client device 110/115). Further, the computing device 600 may be a server device that includes cloud-based processing and storage capabilities.

As shown in FIG. 6, the computing device 600 can include one or more processor(s) 602, memory 604, a storage device 606, input/output interfaces 608 (or "I/O interfaces 608"), and a communication interface 610, which may be communicatively coupled by way of a communication infrastructure (e.g., bus 612). While the computing device 600 is shown in FIG. 6, the components illustrated in FIG. 6 are not intended to be limiting. Additional or alternative components may be used in other embodiments. Furthermore, in certain embodiments, the computing device 600 includes fewer components than those shown in FIG. 6. Components of the computing device 600 shown in FIG. 6 will now be described in additional detail.

In particular embodiments, the processor(s) 602 includes hardware for executing instructions, such as those making up a computer program. As an example, and not by way of limitation, to execute instructions, the processor(s) 602 may retrieve (or fetch) the instructions from an internal register, an internal cache, memory 604, or a storage device 606 and decode and execute them.

The computing device 600 includes memory 604, which is coupled to the processor(s) 602. The memory 604 may be used for storing data, metadata, and programs for execution by the processor(s). The memory 604 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 604 may be internal or distributed memory.

The computing device 600 includes a storage device 606 for storing data or instructions. As an example, and not by way of limitation, the storage device 606 can include a non-transitory storage medium described above. The storage device 606 may include a hard disk drive (HDD), flash memory, a Universal Serial Bus (USB) drive or a combination these or other storage devices.

As shown, the computing device 600 includes one or more I/O interfaces 608, which are provided to allow a user to provide input to (such as user strokes), receive output from, and otherwise transfer data to and from the computing device 600. These I/O interfaces 608 may include a mouse, keypad or a keyboard, a touch screen, camera, optical scanner, network interface, modem, other known I/O devices or a combination of such I/O interfaces 608. The touch screen may be activated with a stylus or a finger.

The I/O interfaces 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 608 are configured to provide graphical data to a display for presentation to a user. The graphical data may be representative of one or more graphical user interfaces or any other graphical content as may serve a particular implementation.

The computing device 600 can further include a communication interface 610. The communication interface 610 can include hardware, software, or both. The communication interface 610 provides one or more interfaces for communication (such as, for example, packet-based communication) between the computing device and one or more other computing devices or one or more networks. As an example, and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI. The computing device 600 can further include a bus 5612. The bus 612 can include hardware, software, or both that connects components of computing device 600 to each other.

As discussed above, the electronic file maintained on the server 118 includes code (e.g., executable code) that can be executed by a reader module 112 (e.g., a computer program) of the customer client device 110. The computer program may execute an instruction of the code to download contextual content from the cloud-based service of the server 118 to the customer client device 110 to present the contextual content. The computer program may execute an instruction of the code to retrieve the contextual content locally from the electronic file to present the contextual content, when there is no network connection between the customer client device 110. and the cloud-based service. For example, contextual content may be located within the code. The computer program may execute an instruction of the code to set a flag within the electronic file when the condition is satisfied and there is no network connection between the customer client device 110 and the cloud-based service. For example, the code may include a variable that represents the flag, which is set by the instruction. The computer program may execute an instruction of the code to notify the cloud-based service that a customer user 102 of the customer client device 110 is a possible lead upon establishing the network connection between the customer device 110 and the cloud-based service when the flag is set. The electronic file may be a portable document format (PDF) file, and the computer program may be a PDF reader. In an embodiment, the condition has been satisfied when the customer user 102 uses the computer program to view the initial content for a certain amount of time. In an embodiment, the condition has been satisfied when the customer user 102 uses a function of the computer program to share the initial content with another user. In an embodiment, the condition has been satisfied when the customer user 102 uses a function of the computer program to highlight, comment, or annotate the initial content. In an embodiment, the condition has been satisfied when the customer user 102 selects a hyperlink within the initial content. In an embodiment, the condition has been satisfied when the customer user 102 uses a zooming function of the computer program to zoom in on an image within the initial content. In an embodiment, the condition has been satisfied when a customer user 102 uses an interface of the computer program to view a section of the initial content more than a certain number of times. In an embodiment, the condition has been satisfied when the customer user 102 uses a function of the computer program to copy part of the initial content. In an embodiment, the condition has been satisfied when the customer user 102 uses a function of the computer program to search for a particular keyword within the initial content. In an embodiment, the contextual content includes interactive content, the code includes instructions for determining a level of interaction of the customer user 102 with the interactive content, and sending the determined level from the customer client device 110 to the server 118. In an embodiment, the customer user 102 is determined to be a possible lead when the level exceeds a threshold. The server 118 may include an artificial neural network configured to automatically detect different structural elements within the initial content and map a selected one of the detected structural elements to the contextual content, where a notification message received from the customer client device 110 identifies the selected one of the detected structural elements.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

What is claimed is:
1. A server for nurturing leads, the server comprising:
a memory storing a computer program;
a network interface for communicating with a computer network; and
a processor configured to execute the computer program,
wherein the computer program is configured to connect to a plurality of client devices over the computer network, the client devices including a marketer device and a customer device, the marketer device including an editor program comprising a graphical user interface (GUI) configured to enable a marketer user to generate initial content and contextual content, and specify a condition with respect to the initial content, and transmit information comprising the initial content, the contextual content, and the condition across the computer network to the server,
wherein, in response to receipt of the transmitted information including the initial content, the contextual content, and the condition, the computer program is configured to generate an electronic file including the initial content and executable code for monitoring an interaction of a customer user of the customer device with the initial content to determine whether the condition has been satisfied,
wherein the initial content is presented on a display of the customer device when the electronic file is opened by a reader program of the customer device,
wherein the reader program executes the executable code to perform the monitoring, and
wherein the reader program presents the contextual content on the display and notifies the server that the customer user is a possible lead, after the monitoring of the interaction with the initial content determines that the condition with respect to a consumption of the initial content has been satisfied.

2. The server of claim 1, wherein the reader program executes an instruction of the executable code to download the contextual content from the server to the customer device to present the contextual content.

3. The server of claim 1, wherein the reader program executes an instruction of the executable code to retrieve the contextual content locally from the electronic file to present the contextual content, when there is no network connection between the customer device and the server.

4. The server of claim 1, wherein the reader program executes an instruction of the executable code to set a flag within the electronic file when the condition is satisfied and there is no network connection between the customer device and the cloud-based service.

5. The server of claim 4, wherein the reader program executes an instruction of the executable code to notify the server that the customer user is a possible lead upon establishing the network connection between the customer device and the cloud-based service when the flag is set.

6. The server of claim 1, wherein the electronic file is a portable document format (PDF) file, and the computer program is a PDF reader.

7. The server of claim 1, wherein the condition has been satisfied when the customer user uses the reader program to view the initial content for a certain amount of time.

8. The server of claim 1, wherein the condition has been satisfied when the customer user uses a function of the reader program to share the initial content with another user.

9. The server of claim 1, wherein the condition has been satisfied when the customer user uses a function of the reader program to highlight, comment, or annotate the initial content.

10. The server of claim 1, wherein the condition has been satisfied when the customer user selects a hyperlink within the initial content.

11. The server of claim 1, wherein the condition has been satisfied when the customer user uses a zooming function of the reader program to zoom in on an image within the initial content.

12. The server of claim 1, wherein the condition has been satisfied when a customer user uses an interface of the reader program to view a section of the initial content more than a certain number of times.

13. The server of claim 1, wherein the condition has been satisfied when the customer user uses a function of the reader program to copy part of the initial content.

14. The server of claim 1, wherein the condition has been satisfied when the customer user uses a function of the reader program to search for a particular keyword within the initial content.

15. A computer-implemented method for nurturing leads, comprising:
    opening, by a reader program of a customer device, an electronic file to present initial content of the electronic file on a display of the customer device, the electronic file further comprising contextual content and executable code;
    executing, by the reader program, an instruction of the executable code to monitor an interaction of a customer user of the customer device with the initial content to determine whether a condition has been satisfied;
    executing, by the reader program, an instruction of the executable code to present the contextual content on the display when it is determined that the condition has been satisfied;
    executing, by the reader program, an instruction of the executable code to set a flag within the electronic file when there is no network connection between the customer device and a server that is remote from the customer device and it is determined that the condition with respect to consumption of the initial content has been satisfied;
    executing, by the reader program, an instruction of the executable code to determine whether the network connection between the customer device and the server has been established; and
    executing, by the reader program, an instruction of the executable code to notify the server that the condition has been satisfied when the flag is set and it is determined that the network connection between the customer device and the server has been established.

16. The computer-implemented method of claim 15, wherein the electronic file is a portable document format (PDF) file, and the computer program is a PDF reader.

17. A system for nurturing leads comprising:
    a marketer device comprising a first memory storing a first computer program, a network first interface for communicating with a computer network, and a first processor configured to execute the first computer program
    a server comprising a second memory storing a second computer program, a second network interface for communicating with the computer network, and a second processor configured to execute the second computer program,
    wherein the first computer program is configured to enable a marketer user of the marketer device to remotely generate initial content, generate contextual content, specify a condition with respect to the initial content, and transmit information including the initial content, contextual content, and the condition across the computer network,
    wherein the second computer program, in response to receiving the information including the initial content, contextual content, and the condition, is configured to generate an electronic file including the initial content and executable code including instructions for monitoring interactions of a customer user on a customer device with the initial content and sending a notification message from the customer device to the server based on the monitoring,
    wherein the second computer program is further configured to transmit the contextual content across the computer network to the customer device in response to the notification message.

18. The system of claim 17, wherein the contextual content includes interactive content, the executable code includes instructions for determining a level of interaction of the customer user with the interactive content, and sending the determined level from the customer device to the server.

19. The system of claim 18, wherein the second computer program determines the customer user to be a possible lead when the level exceeds a threshold.

20. The system of claim 17, wherein the executable code comprises an artificial neural network configured to automatically detect different structural elements within the initial content and map a selected one of the detected structural elements to the contextual content, where the notification message identifies the selected one of the detected structural elements.

* * * * *